United States Patent
Miatt et al.

[11] Patent Number: 6,085,508
[45] Date of Patent: Jul. 11, 2000

[54] ROTATING LAWN MOVER WITH A CUTTER HEAD MOVABLE BETWEEN CUTTING AND MULCHING POSITIONS

[75] Inventors: Steven Richard Miatt, Narangba; Stephen Leonard Jackson, McDowall; Gaven Ray Dall'osto, Aspley, all of Australia

[73] Assignee: Rovers Mowers Limited, Eagle Farm, Australia

[21] Appl. No.: 09/072,588

[22] Filed: May 4, 1998

[30] Foreign Application Priority Data

May 12, 1997 [AU] Australia .............................. 06743/97

[51] Int. Cl.⁷ .......................... A01D 34/03; A01D 34/43; A01D 34/64
[52] U.S. Cl. ................ 56/17.1; 56/15.5; 56/15.9
[58] Field of Search .................... 56/17.1, 15.9, 56/16.7, 15.7, 15.8, DIG. 3, DIG. 10

[56] References Cited

U.S. PATENT DOCUMENTS

| | | | |
|---|---|---|---|
| 2,926,926 | 3/1960 | Rowe et al. | 56/17.2 |
| 3,696,594 | 10/1972 | Freimuth et al. | 56/15.2 |
| 3,795,094 | 3/1974 | Mollen et al. | 56/11.1 |
| 4,313,295 | 2/1982 | Hansen et al. | 56/15.9 |
| 4,577,455 | 3/1986 | Amano et al. | 56/17.1 |
| 4,679,382 | 7/1987 | Saruhashi et al. | 56/10.1 |
| 4,760,686 | 8/1988 | Samejima et al. | 56/15.9 |
| 4,779,406 | 10/1988 | Schroeder | 56/15.9 |
| 4,829,754 | 5/1989 | Shimamura et al. | 56/15.9 |
| 4,859,057 | 8/1989 | Taylor et al. | 356/41 |
| 4,869,057 | 9/1989 | Siegrist | 56/15.9 |
| 4,934,130 | 6/1990 | Johansson et al. | 56/15.9 |
| 4,977,732 | 12/1990 | Minter | 56/11.4 |
| 5,065,568 | 11/1991 | Braun et al. | 56/17.1 |
| 5,079,907 | 1/1992 | Sameshima et al. | 56/15.9 |
| 5,085,044 | 2/1992 | Freier, Jr. et al. | 56/17.1 |
| 5,129,218 | 7/1992 | Youngberg et al. | 56/15.8 |
| 5,321,938 | 6/1994 | LeBlanc | 56/6 |
| 5,351,437 | 10/1994 | Trefz et al. | 56/17.1 |
| 5,355,664 | 10/1994 | Zenner | 56/15.8 |
| 5,367,864 | 11/1994 | Ogasawara et al. | 56/15.8 |
| 5,381,648 | 1/1995 | Seegert et al. | 56/17.1 |
| 5,398,489 | 3/1995 | Oshima | 56/17.2 |
| 5,410,865 | 5/1995 | Kurohara et al. | 56/17.1 |
| 5,433,066 | 7/1995 | Wenzel et al. | 56/14.7 |
| 5,475,971 | 12/1995 | Good et al. | 56/14.9 |
| 5,556,535 | 9/1996 | Pruitt | 56/15.1 |
| 5,775,075 | 7/1998 | Dannar | 56/15.9 |
| 5,816,033 | 10/1998 | Busboom et al. | 56/17.1 |

FOREIGN PATENT DOCUMENTS

| | | | |
|---|---|---|---|
| 0 047 502 | 3/1982 | European Pat. Off. . | |
| 0 144 214 | 6/1985 | European Pat. Off. . | |
| 0355365 | 11/1989 | European Pat. Off. | 56/17.1 |
| 355365 | 2/1990 | European Pat. Off. | 56/17.1 |
| 374588 | 6/1990 | European Pat. Off. | 56/17.1 |
| 2302672 | 10/1976 | France | 56/17.1 |
| 1482249 | 4/1969 | Germany | 56/17.1 |
| 2901802 | 7/1979 | Germany | 56/17.1 |
| 1010482 | 8/1964 | United Kingdom | 56/17.1 |
| 1010482 | 11/1965 | United Kingdom . | |
| 1486103 | 9/1977 | United Kingdom . | |
| 1597925 | 9/1981 | United Kingdom . | |
| 2183981 | 6/1987 | United Kingdom . | |
| 2305840 | 4/1997 | United Kingdom . | |

*Primary Examiner*—Robert E Pezzuto
*Assistant Examiner*—Arpad Fabian Kovacs

[57] ABSTRACT

A mower including a mower deck having a cutting chamber therein; and a rotatable cutter head disposed within the cutting chamber for cutting in a sweep or cutting plane wherein the sweep or cutting plane of the cutter head is movable relative to the grass surface being cut so that it can adopt a number of operating positions. The cutting chamber has an inner wall which includes a first wall section adjacent the cutter head in the region of the cutting or sweep plane and a recess in an upper section of the inner wall above the cutting or sweep plane, there being a step between the first wall section and upper wall section of the inner wall.

12 Claims, 5 Drawing Sheets

ROTATING LAWN MOVER WITH A CUTTER HEAD MOVABLE BETWEEN CUTTING AND MULCHING POSITIONS

This invention relates generally to mowers for mowing grass or the like. More particularly the invention relates to mowers of the type which can be used either in a catching mode or a mulching mode of operation.

Mowers of the type which can be used either in a grass catching mode where the cut grass is discharged to a catcher or in a mulching mode where the grass is cut into small pieces and returned to the ground are becoming increasingly popular. Such mowers generally comprise a housing having a cutting chamber therein for receiving a cutter head mounted for rotation within the chamber. A discharge outlet provides for the discharge of grass clippings from the cutting chamber to a catcher when used in the grass catching mode. In the mulching mode the discharge outlet is adapted to be closed by, for example, an insert or plug so that grass is cut and the clippings then returned to the ground. The cutter head may be in the form of a disc with blades attached thereto or a cutter bar and may be modified to enhance its operation in both the catching and mulching modes. It will be appreciated that mowers of this type have to be of a compromised design so that they can operate in both modes.

In conventional grass catching mowers the cutting chamber is generally volute in shape so as to channel the grass clippings from one side of the cutting chamber around in the direction of rotation of the cutter head to the discharge outlet and then the catcher. The particular configuration of the area above the plane of the blade sweep provides for an increasing area in the direction of rotation. In mowers of this type when converted to a mulching mode of operation the discharge outlet is closed by, for example, an insert which has an inner side wall which follows the shape of the inner side wall of the chamber and an upper wall which follows the contour of a section of the ceiling of the chamber.

The ceiling of the chamber forms a transition between the highest part of the chamber (in the discharge outlet area) to the lowest part which is adjacent. The positioning of the closure horizontal partition reduces the area of the chamber in this lowest part of the chamber and as a result the clippings tend to be urged towards the discharge outlet and as a result the clippings tend to be urged towards the ground in visible trails. Such trails are undesirable in mulch mode of operation.

It is an object of the present invention to provide an improved mower and/or components therefore which can improve the operation of mowers of this type.

According to one aspect of the present invention there is provided a mower which includes a mower deck having a cutting chamber therein; and a rotatable cutter head disposed within the cutting chamber for cutting in a sweep or cutting plane wherein the sweep or cutting plane of the cutter head is movable relative to the grass surface being cut so that it can adopt a number of operating positions.

Preferably the cutter head is movable between a first position in which the sweep or cutting plane is inclined upwardly and forwardly with respect to the normal direction of travel of the mower when in use and a second position in which the cutter head is inclined upwardly and rearwardly. It is further preferred that the cutter head can adopt a number of intermediate positions between the aforementioned first and second positions.

Preferably, the cutter head is rotatably mounted to the mower deck and the mower deck is adapted for movement relative to the grass surface being cut so as to permit the cutter head to adopt the various operating positions.

Preferably, the deck is supported by ground engaging elements which may be in the form of wheels, rollers or the like. In one preferred form the mower includes forward ground engaging wheels and rearward ground engaging wheels.

Preferably, the mower includes adjustment means for causing the tilting movement of the cutter head through its operating positions. In one preferred form the tilting movement is achieved by relative movement between the deck and either the forward or rearward ground engaging wheels.

The adjustment means may include a control link pivotally mounted to the deck and being operatively connected to a wheel so that pivotal movement of the control link causes relative movement of the deck and wheel. The adjustment means may further include a drive link which is operable to cause pivotable movement of the control link. The drive link may include an arm which is operatively mounted to the deck for sliding movement relative thereto. To this end a section of the arm may be slidably disposed within a track on the deck.

Locking means may be provided for locking the slidable arm in a fixed position relative to the deck. Such locking means may be in the form of a clamping knob which is adapted to engage the arm.

The drive link may include a fixed section which is operatively connected to a further control link on the other wheel or wheels so that the cutting height can be adjusted.

Biasing means such as for example, a spring may be provided for urging the height adjustment control lever into one of its operating positions.

Relative movements of the slidable arm and the deck can be achieved by applying downwards or upwards pressure to the deck.

According to another aspect of the present invention there is provided a mower which includes a mower deck having a cutting chamber therein, a rotatably mounted cutter head disposed within the cutting chamber for cutting in a cutting or sweep plane. The mower is characterized in that the cutting chamber has an inner wall which includes a first wall section adjacent the cutter head in the region of the cutting or sweep plane and a recess in an upper section of the inner wall above the cutting or sweep plane, there being a step between the first wall section and upper wall section of the inner wall.

Preferably, there is further provided a deflector disposed inwardly from the recess and above the sweep plane.

The recessed wall section may form part of a plug or insert which is adapted to block the discharge opening of mowers of the type which can be used either in a catching mode or mulching mode. The recessed wall section may, if desired, extend over a distance beyond the insert into a further part of the inner wall of the chamber.

Preferred embodiments of the invention will hereinafter be described with reference to the accompanying, and in those drawings.

Figure 1:
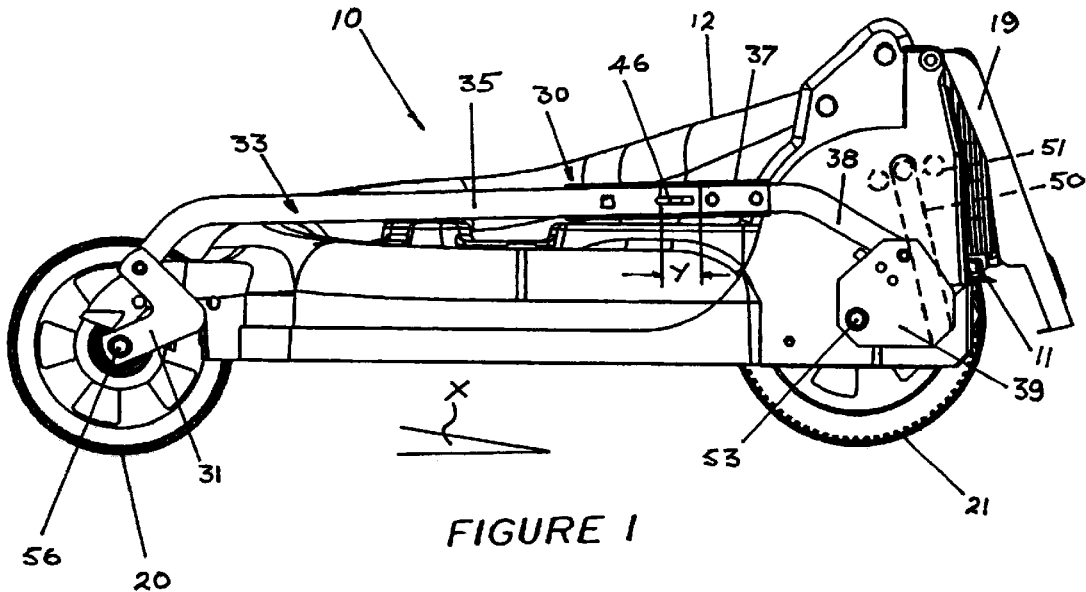
FIG. 1 is a schematic side elevation of a mower according to one embodiment of the invention with the sweep plane of the cutter head in one operating position.

Referring to FIGS. 1 to 4 there is shown a mower generally indicated at 10 which includes a mower deck 12 having a cutting chamber 14 therein, and a rotatable cutter head 16 disposed within the cutting chamber. The chamber 14 and rotatable cutter head 16 are shown for example in FIG. 4. The sweep plane of the cutter head is movable relative to the grass surface being cut so that it can adopt a number of operating positions. The mower has a discharge outlet 11 at the rear of the mower which, when the mower is used in a lawn cutting mode is adapted to discharge the clippings therethrough. A catcher can be mounted at the discharge opening for collecting the clippings. Hinged flap 19 can be adapted to support the catcher.

Figure 2:
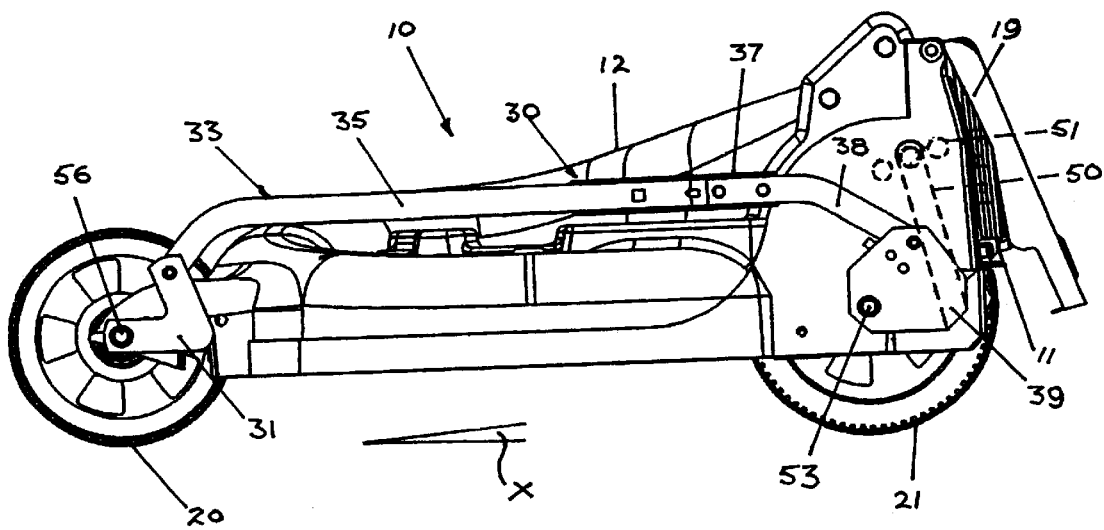
FIG. 2 is a similar view to that of FIG. 1 with the sweep plane of the cutter head in another operating position.

As, the cutter head 16 is movable between a first position in which the sweep cutting plane is inclined upwardly and forwardly with respect to the normal direction of travel of the mower when in use (FIG. 1) and a second position in which the cutter head is inclined upwardly and rearwardly (FIG. 2). In the position of FIG. 1 where the forward end of the cutter head is displaced above the rearward end by a angle X the mower is particularly suited for operation in the mulching mode. Because of this tilt a further cut of the clippings is effected before the clippings are returned to the ground. In the position of FIG. 2 where the cutter head is tilted forwardly by angle X the mower is more suited for operation in the catching mode. It will be appreciated that the cutter head 16 can adopt a number of intermediate positions between the aforementioned first and second positions. In the embodiment shown the cutter head 16 is rotatably mounted to the mower deck 12 and the mower deck is adapted for movement relative to the grass surface being cut so as to permit the cutter head to adopt the various operating positions.

Figure 4:
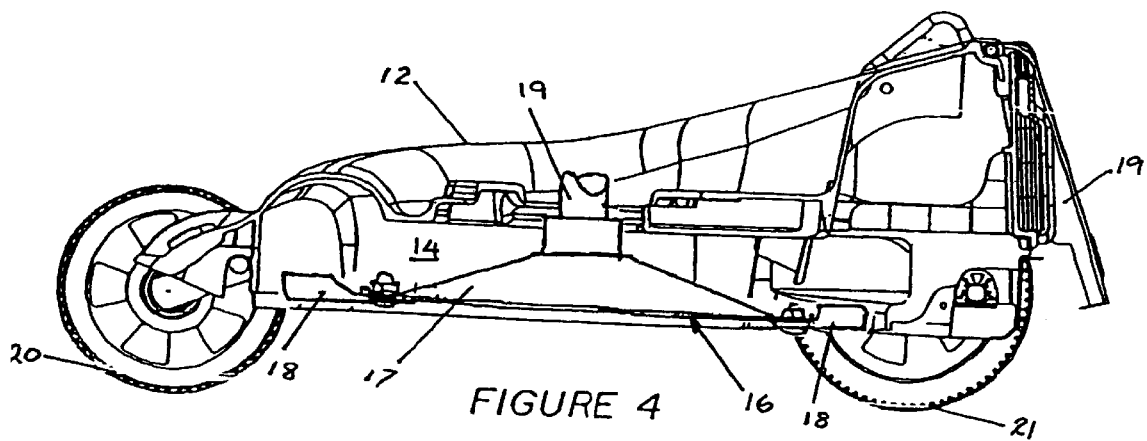
FIG. 4 is a schematic sectional side elevation of the mower shown in FIG. 3.

As shown in FIG. 4, the cutter head 16 includes a disc 17 having a series of cutting blades 18 mounted at the peripheral edge thereof. The disc 17 is connected to shaft 19 which in turn is operatively connected to a suitable power source to cause rotation thereof.

Figure 3:
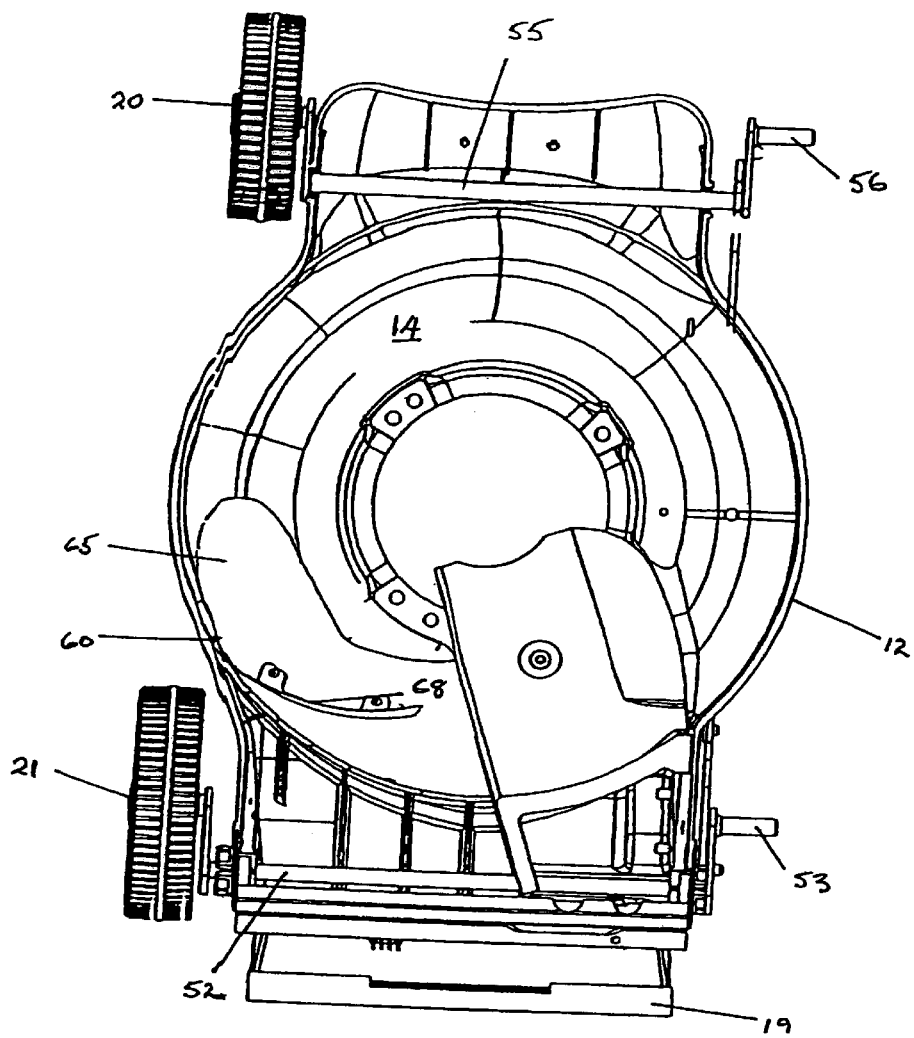
FIG. 3 is a schematic underside view of a mower according to another embodiment of the invention.

The deck 12 is supported by ground engaging elements in the form of a pair of front wheels 20 and a pair of rear wheels 21. Each front wheel 20 is supported on a separate stub axle 56 and each rear wheel 21 supported on separate stub axles 53. As best seen in FIG. 3 front wheels 20 are connected to a common axle 55 mounted to the deck 12 and the rear wheels 21 connected to a common axle 52 mounted on deck 12. The manner of connection between the wheels and their respective common axles will hereinafter be described.

Figure 5:
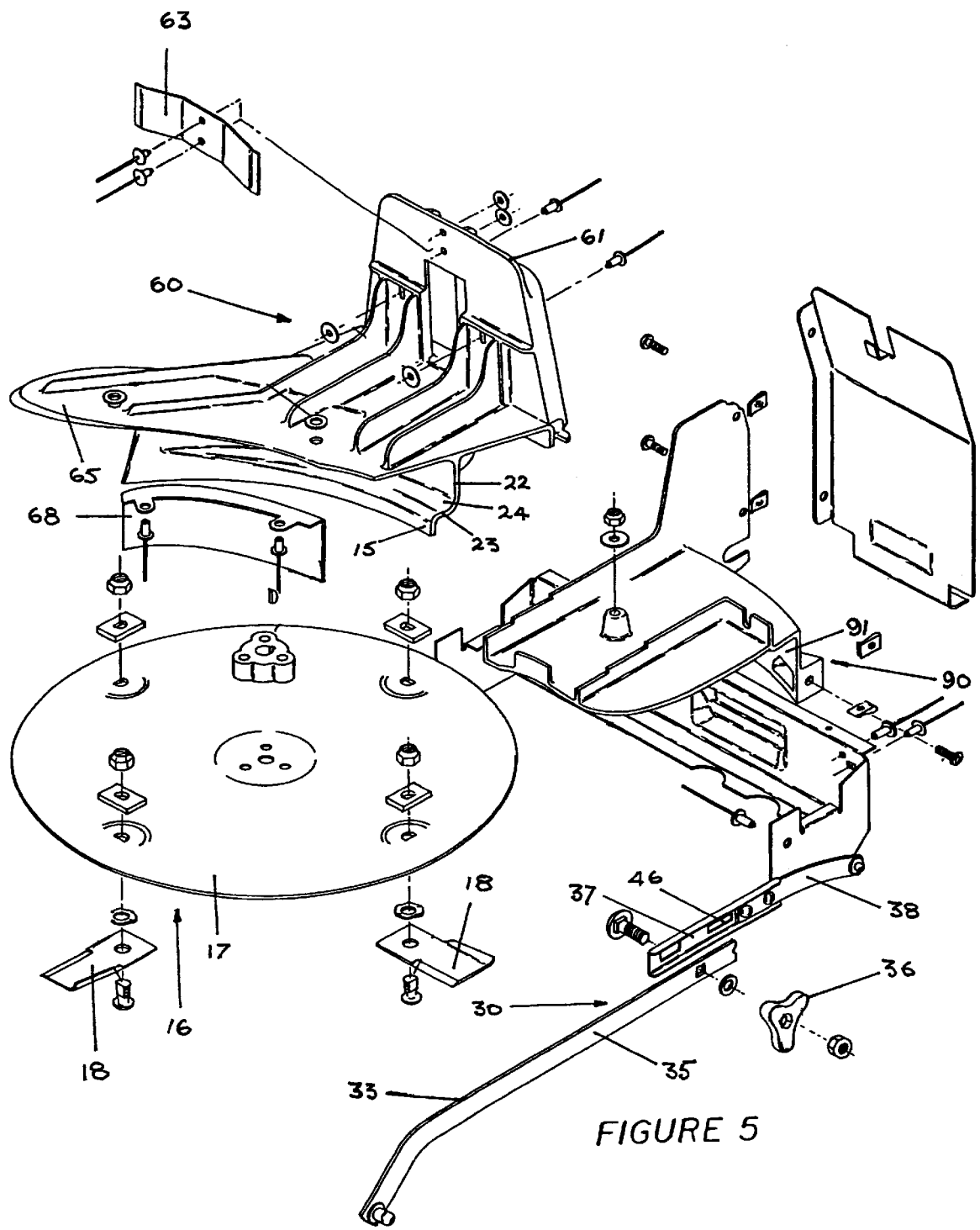
FIG. 5 is an exploded view of various components of a mower according to an embodiment of the present invention.

As seen in FIGS. 1, 2 and 5, the mower 10 further includes adjustment means 30 for causing the tilting movement of the cutter head through its various operating positions. As shown, the tilting movement is achieved by relative movement between the deck and either the forward or rearward ground engaging wheels.

The adjustment means 30 includes a pair of control links 31 pivotally mounted to the deck 12 at axle 55 for rotation therewith. One end of control link 31 is operatively connected to a respective wheel 20 so that pivotal movement of the control links 31 causes relative movement between the deck 12 and wheels 20. The adjustment means further includes a drive link 33 which is operable to cause pivotable movement of the control links 31. The drive link 33 includes an arm 35 which is operatively mounted to the deck for sliding movement relative thereto. To this end a section of the arm 35 may be slidably disposed within a track 37 on the deck 12 or on a fixed section 38. The track 37 is best seen in FIG. 5.

Locking means is provided for locking the drive arm 35 in a fixed position relative to the deck. As shown in FIG. 5, the locking means is in the form of a clamping knob 36 which is adapted to engage the arm 35 and hold it in fixed relation to the deck. Thus by, movement of arm 35 along track 37 causes pivotal movement of links 31 about axle 55 which, in turn, causes relative pivotal movement of the deck about axle 52. The arm 35 can move along the track 37 so that it is spaced by a distance Y (FIG. 1) from an abutment which is in the form of fixed section 38 of the arm or to a position where it is in abutment with fixed section 38. Biasing means such as for example, a spring (not shown) may be provided for urging the arm 35 into one of its operating positions. The spring can be attached to slot 46 and the deck. Relative movement of the arm 35 and the deck can be achieved by applying downwards and upwards pressure to the deck.

As mentioned above the drive link 33 may include a fixed section 38 which is operatively connected to a pair of further control links 39 on the rear wheels 21. Control links 39 are mounted to the deck 12 for pivotal movement about common axle 52. Fixed section 38 of drive link 33 is connected to one of the control links 39 and each rear wheel 21 is connected to a respective control link 39 via its associated stub axle 53. The control links 39 are also operatively connected to height adjustment lever 50 which can be selectively positioned in one of the locating apertures 51. Thus by locking knob 36, the two sections of link 35 act together and in conjunction with lever 50 to raise or lower the height of the deck 12.

Figure 6:
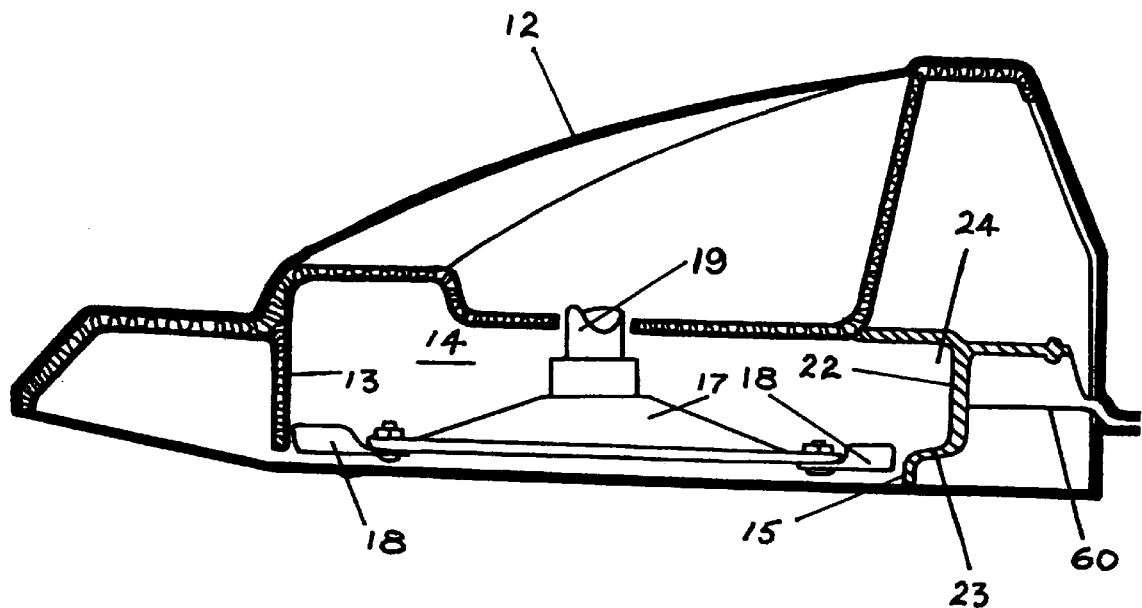
FIG. 6 is a schematic partial sectional side elevation of a mower according to another embodiment of the present invention.
Figure 7:
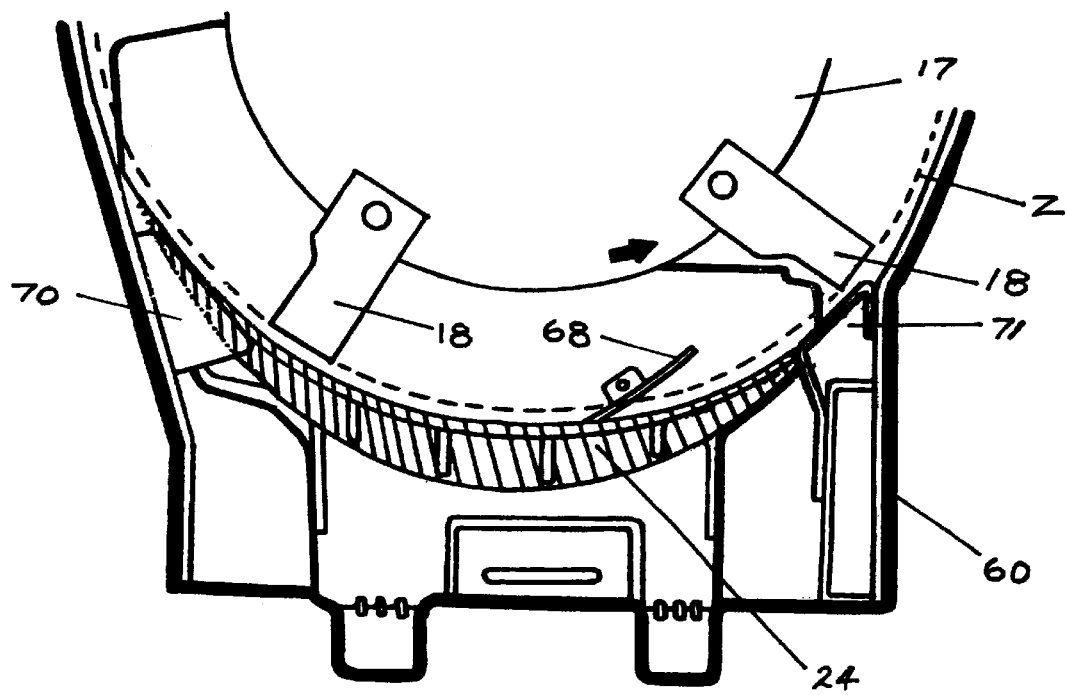
FIG. 7 is a part underside view of the embodiment shown in FIG. 6.
Figure 8:
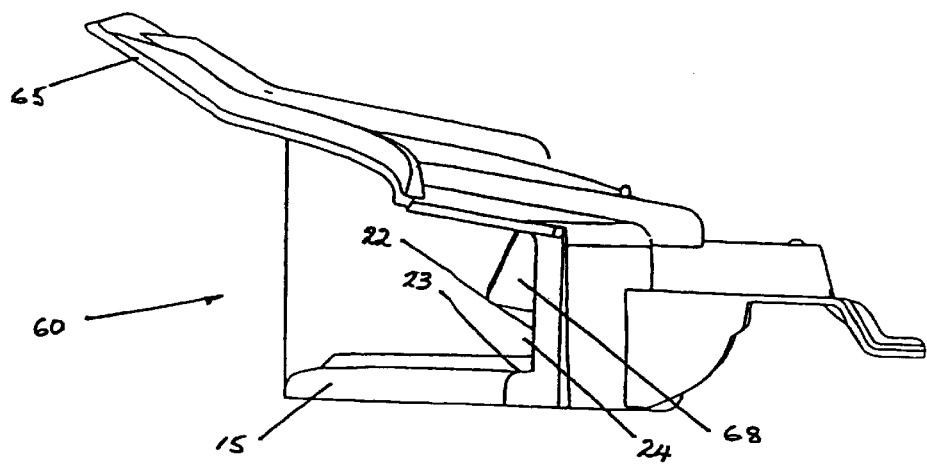
FIG. 8 is a side elevation of a component for use in a mower according to the present invention.
Figure 9:
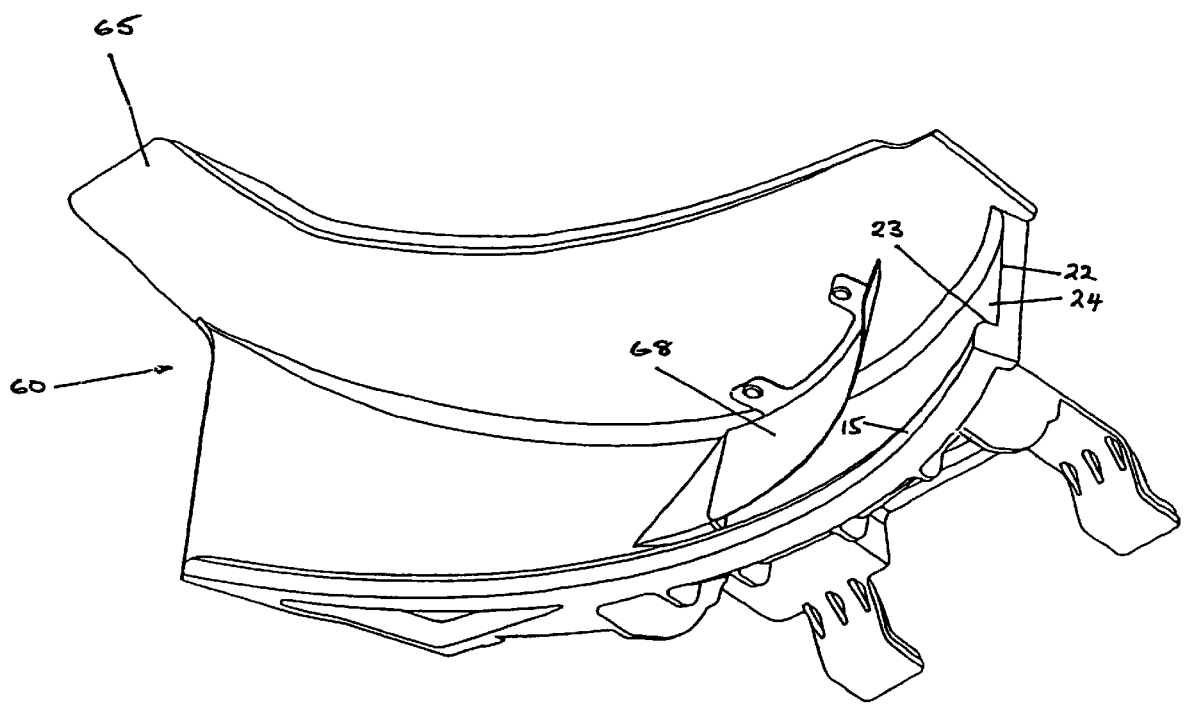
FIG. 9 is a an underside view of the component shown in FIG. 8.

Referring specifically now to FIGS. 5, 6 and 7 of the drawings, there is shown a mower 10 having a deck 12 with a cutting chamber 14 therein. A cutter head 16 is disposed within the chamber 14 and mounted for rotation on shaft 19. The cutter head 16 also includes a disc 17 connected to shaft 19 with a series of blades 18 projecting outwardly therefrom for rotation in a sweep plane having an outer circumference shown by dotted line Z.

The cutter chamber 14 has an inner wall 13 which includes a first wall section 15 which is spaced from but in close proximity to the outer edges of the blades 18. The inner wall 13 further includes a recessed wall section 22 which is disposed above the first wall section. The recessed section 22 forms a step or ledge 23 between recessed wall section 22 and inner wall 13 and/or section 15 with a space or recess 24 above the step.

In the embodiments shown, the recessed section 22 of the wall is at least in part provided in an insert 60. Two embodiments of insert 60 are shown in FIGS. 3, 4 and 5 and FIGS. 6 to 9. The insert 60 is adapted to block the outlet opening 11 from chamber 14 when the mower is being used in the mulching mode. In the embodiment of FIGS. 3 to 5 the insert 60 includes a main body 61 having a handle with a retaining spring clip 63 which assists in holding the insert in place. In the embodiment of FIGS. 6 to 9 the insert is carried on support flanges 70 and 71. The insert further includes a ramped upper wall section or tongue 65 which in the fitted position is disposed adjacent the upper wall of the cutting chamber 14. The insert 60 further includes a closure wall which defines part of the inner wall of the chamber when in the fitted position. The closure wall includes a first wall section defining inner wall section 13 which sits adjacent the blades when in the fitted position and a recessed section defining the recess 24 and step 23. The insert 60 further includes a deflector 68 which is disposed inwardly of the recess and above the blades. The additional deflector 68 channels some clippings from the outer periphery of the deck towards the center of the chamber.

In the embodiment shown in FIGS. 3 to 5, the insert 60 is disposed along side a fixed insert 90 which can house a drive belt for self propelled type mowers. The fixed insert 90 includes a wall portion 91 which can have formed therein part of the first wall section 15 and recessed wall section 22.

In the embodiment of FIGS. 6 to 9 the removable insert 60 extends across the rear of the mower. The cross-hatching shown in FIGS. 6 and 7 illustrates the recessed section 24.

With the arrangement of this aspect of the invention, the insert maintains a similar clearance from the ends of the blades to the mower deck, forming a complete circle. This ensures that the tendency of clippings to fall at any point on the perimeter is equal. Furthermore, the vertical face of the insert where there is limited area steps back away from the center of blade rotation, just above the blade sweep, to effectively increase the available area for the clippings and thus closely replicate a uniform cross sectional area in turn improving the mulching performance. Furthermore, the deflector is positioned in the section of limited area to direct some clippings towards the center of the deck to maintain a more uniform density of clippings in turn improving the mulch performance.

Finally, it is to be understood that various alterations, modifications and/or additions may be incorporated into the various constructions and arrangements of parts without departing from the spirit or ambit of the invention.

What is claimed is:

1. A rotary lawn mower including a mower deck having a cutting chamber therein and a rotatable cutter head disposed within the cutting chamber for cutting in a sweep or cutting plane, ground engaging elements for supporting the deck, so that the mower can travel over a grass surface to be cut, the mower further including cutting height adjustment means operable to adjust cutting height of the cutter head, and sweep plane adjustment means operable independently of the cutting height adjustment means so that the sweep or cutting plane of the cutter head is movable relative to the grass surface to be cut so that it can adopt a number of cutting operating positions including a first position in which the sweep or cutting plane is inclined upwardly and forwardly with respect to the normal direction of travel of the mower when in use and a second position in which the cutter head is inclined upwardly and rearwardly.

2. The mower according to claim 1 wherein said sweep plane adjustment means is operable so that said cutter head can adopt a number of intermediate positions between the said first and second positions.

3. The mower according to claim 2, wherein the cutter head is rotatably mounted to the mower deck and the mower deck is adapted for movement relative to the grass surface to be cut so as to permit the cutter head to adopt the various operating positions.

4. The mower according to claims 1 to 3 wherein said sweep plane adjustment means causes a tilting movement of the cutter head through its operating positions.

5. The mower according to claim 4 wherein said ground engaging elements include forward and rearward ground engaging wheels, and the tilting movement is achieved by relative movement between the deck and either the forward or rearward ground engaging wheels.

6. The mower according to claims 1 to 3 wherein said sweep plane adjustment means includes a control link pivotally mounted to the deck and being operatively connected to a wheel so that pivotal movement of the control link causes relative movement of the deck and wheel and a drive link which is operable to cause pivotable movement of the control link, the drive link including an arm which is operatively mounted to the deck for sliding movement relative thereto.

7. The mower according to claim 6 wherein said arm is slidably disposed within a track on the deck.

8. The mower according to claim 7 further including locking means for locking the slidable arm in a fixed position relative to the deck.

9. The mower according to claim 8 wherein said locking means includes a clamping knob which is adapted to engage the arm.

10. The mower according to claim 9 wherein said drive link includes a fixed section which is operatively connected to a further control link on another ground engaging wheel or wheels so that the cutting height can be adjusted.

11. The mower according to claim 10 including spring means for urging the height adjustment means into one of its operating positions.

12. The mower according to claim 11 wherein relative movement of the slidable arm and the deck is effected by applying downwards or upwards pressure to the deck.

* * * * *